United States Patent
Yang et al.

(10) Patent No.: US 11,085,421 B2
(45) Date of Patent: Aug. 10, 2021

(54) PLANET CARRIER OF A WIND TURBINE GEARBOX WITH IMPROVED LUBRICANT PATH

(71) Applicants: General Electric Company, Schenectady, NY (US); Kai Yang, Shanghai (CN); Claus Kruempelbeck, Rheine (DE); Wei Zheng, Shanghai (CN); Rong Li, Shanghai (CN)

(72) Inventors: Kai Yang, Shanghai (CN); Claus Kruempelbeck, Rheine (DE); Wei Zheng, Shanghai (CN); Rong Li, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/635,817

(22) PCT Filed: Aug. 3, 2017

(86) PCT No.: PCT/CN2017/095821
§ 371 (c)(1),
(2) Date: Jan. 31, 2020

(87) PCT Pub. No.: WO2019/024043
PCT Pub. Date: Feb. 7, 2019

(65) Prior Publication Data
US 2020/0224642 A1 Jul. 16, 2020

(51) Int. Cl.
*F03D 80/70* (2016.01)
*F03D 15/00* (2016.01)
(Continued)

(52) U.S. Cl.
CPC ............. *F03D 80/70* (2016.05); *F03D 15/00* (2016.05); *F16H 57/082* (2013.01);
(Continued)

(58) Field of Classification Search
None
See application file for complete search history.

(56) References Cited

U.S. PATENT DOCUMENTS 5,846,153 A * 12/1998 Matsuoka .............. B60K 17/02
475/269
7,931,556 B2 * 4/2011 Diosi .................. F16H 63/3026
475/116
(Continued)

FOREIGN PATENT DOCUMENTS

CN 201 448 430 U 5/2010
CN 201560902 U 8/2010
(Continued)

OTHER PUBLICATIONS

EP. 17919864 search opinion (Year: 2020).*
(Continued)

*Primary Examiner* — Dirk Wright
(74) *Attorney, Agent, or Firm* — Dority & Manning, P.A.

(57) ABSTRACT

A gearbox assembly includes a gearbox housing and a planetary gear system configured within the gearbox housing. The planetary gear system includes a plurality of planet gears, at least one sun gear, at least one ring gear, at least one planetary carrier operatively coupled with the plurality of planet gears, and a plurality of pin shafts. Each of the plurality of planet gears are arranged so as to rotate around one of the plurality of pin shafts. Further, the plurality of planet gears are engaged with the ring gear and configured to rotate about the sun gear. The gearbox assembly also includes a first lubricant path defined from a first location to a second location through the at least one planetary carrier. Moreover, the first lubricant path is located outside of the plurality of pin shafts.

16 Claims, 8 Drawing Sheets

(51) Int. Cl.
*F16H 57/08* (2006.01)
*F16H 57/02* (2012.01)
(52) U.S. Cl.
CPC . *F05B 2240/50* (2013.01); *F05B 2260/40311* (2013.01); *F05B 2260/98* (2013.01); *F16C 2361/61* (2013.01); *F16H 2057/02078* (2013.01)

(56) References Cited

U.S. PATENT DOCUMENTS

| | | | | |
|---|---|---|---|---|
| 8,365,866 | B2* | 2/2013 | Ciszak | F03D 80/70 |
| | | | | 184/6.12 |
| 8,597,155 | B2* | 12/2013 | Noller | F03D 15/00 |
| | | | | 475/331 |
| 9,958,055 | B2* | 5/2018 | Iwasaki | F16H 57/0479 |
| 2012/0083384 | A1 | 4/2012 | Ziemer et al. | |

FOREIGN PATENT DOCUMENTS

| | | |
|---|---|---|
| CN | 201714590 U | 1/2011 |
| CN | 201714592 U | 1/2011 |
| CN | 103161925 A | 6/2013 |
| CN | 105202169 A | 12/2015 |
| EP | 1717489 A2 * | 11/2006 ......... F16H 57/0479 |

OTHER PUBLICATIONS

PCT International Search Report Corresponding to PCT/CN2017/095821 dated Sep. 27, 2017.
EPO Search Report, dated Jan. 26, 2021.

* cited by examiner

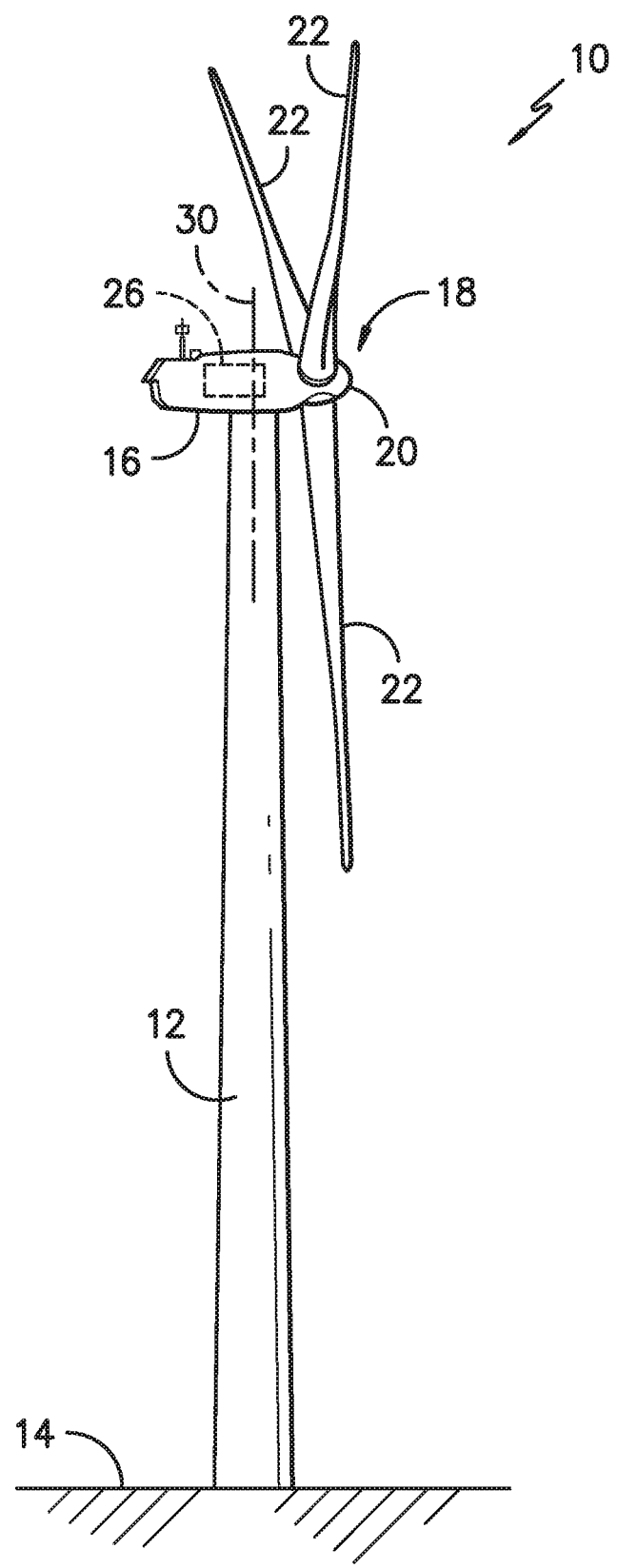
FIG. -1-

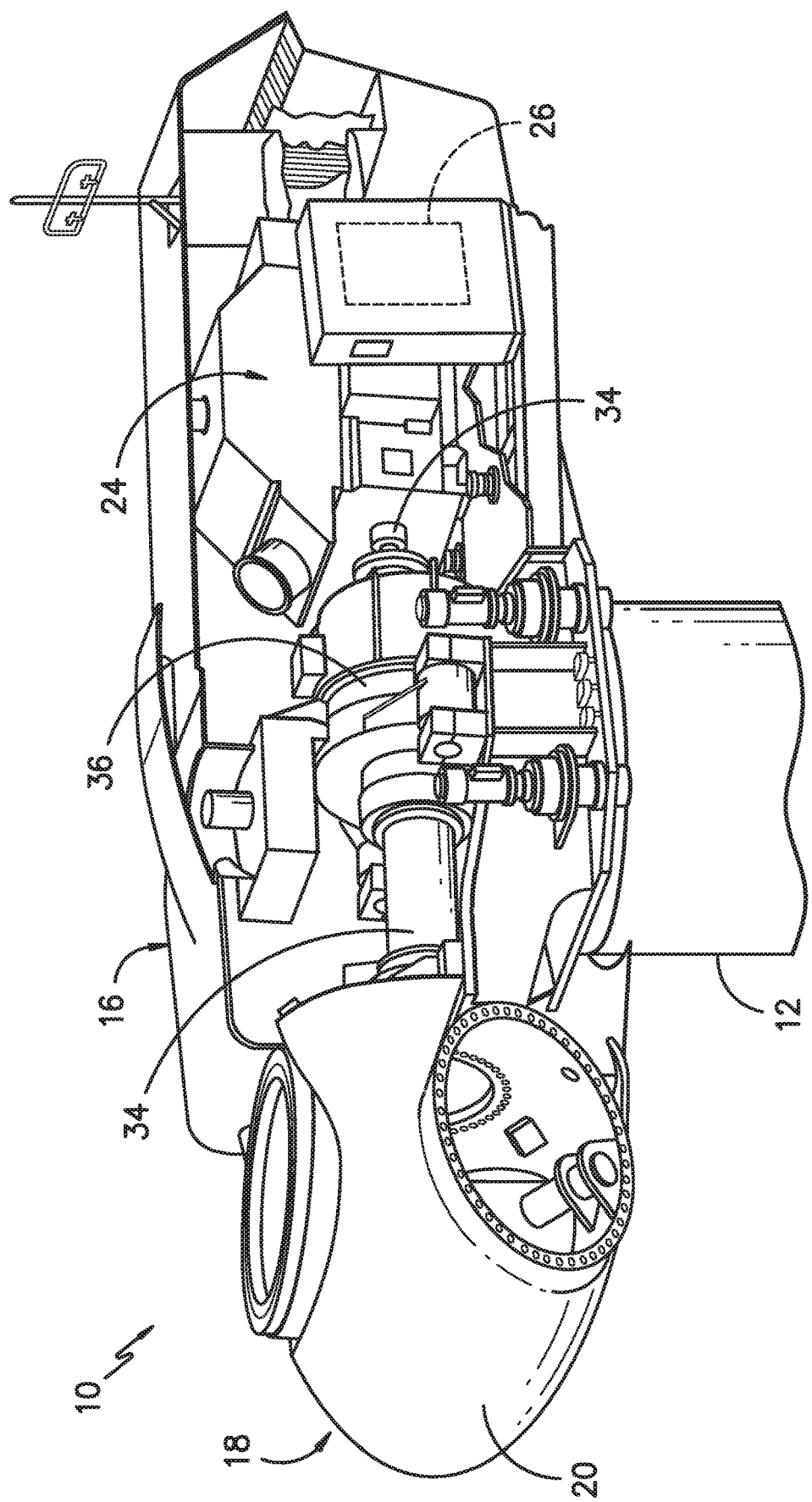
FIG. -2-

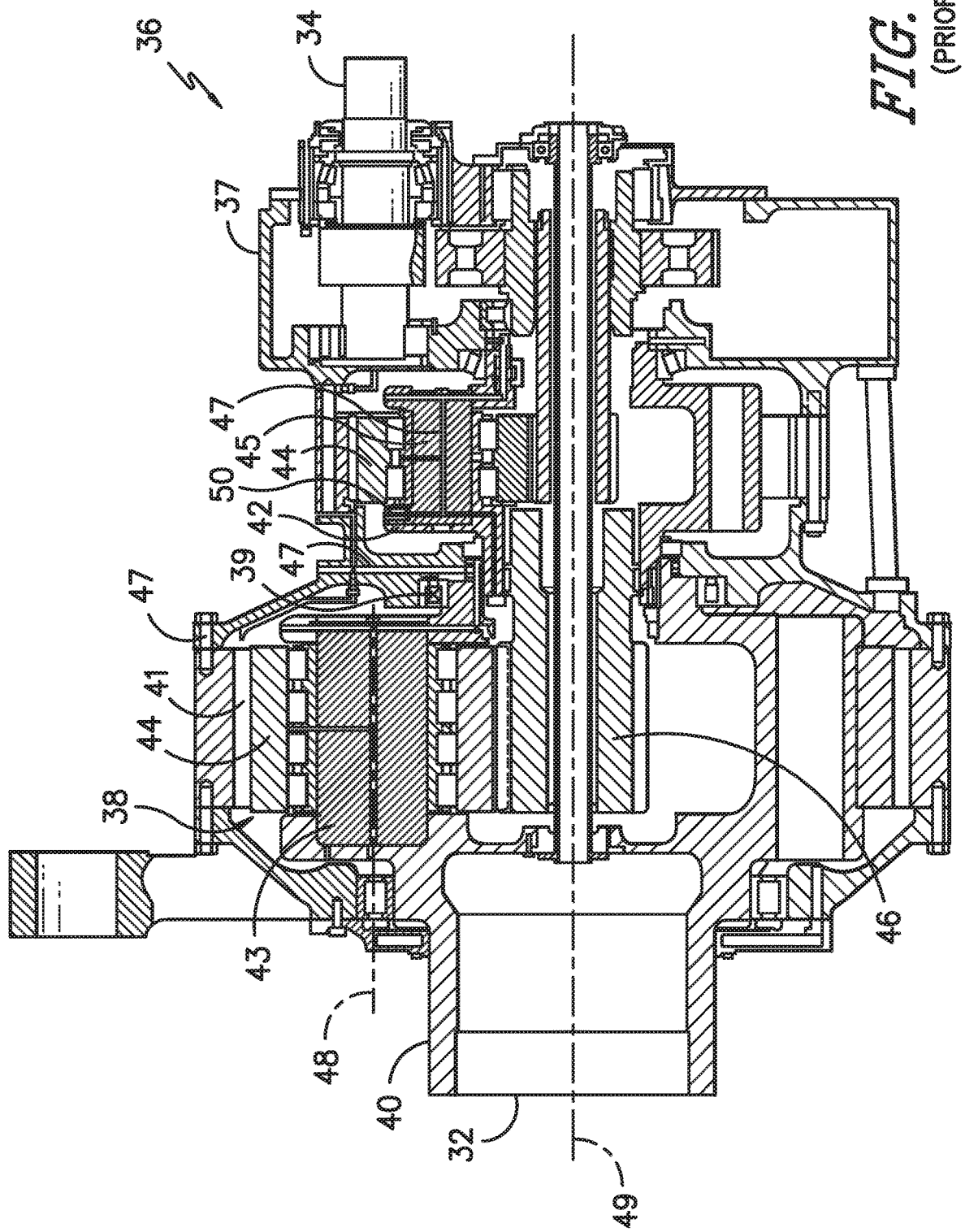
FIG. -3-
(PRIOR ART)

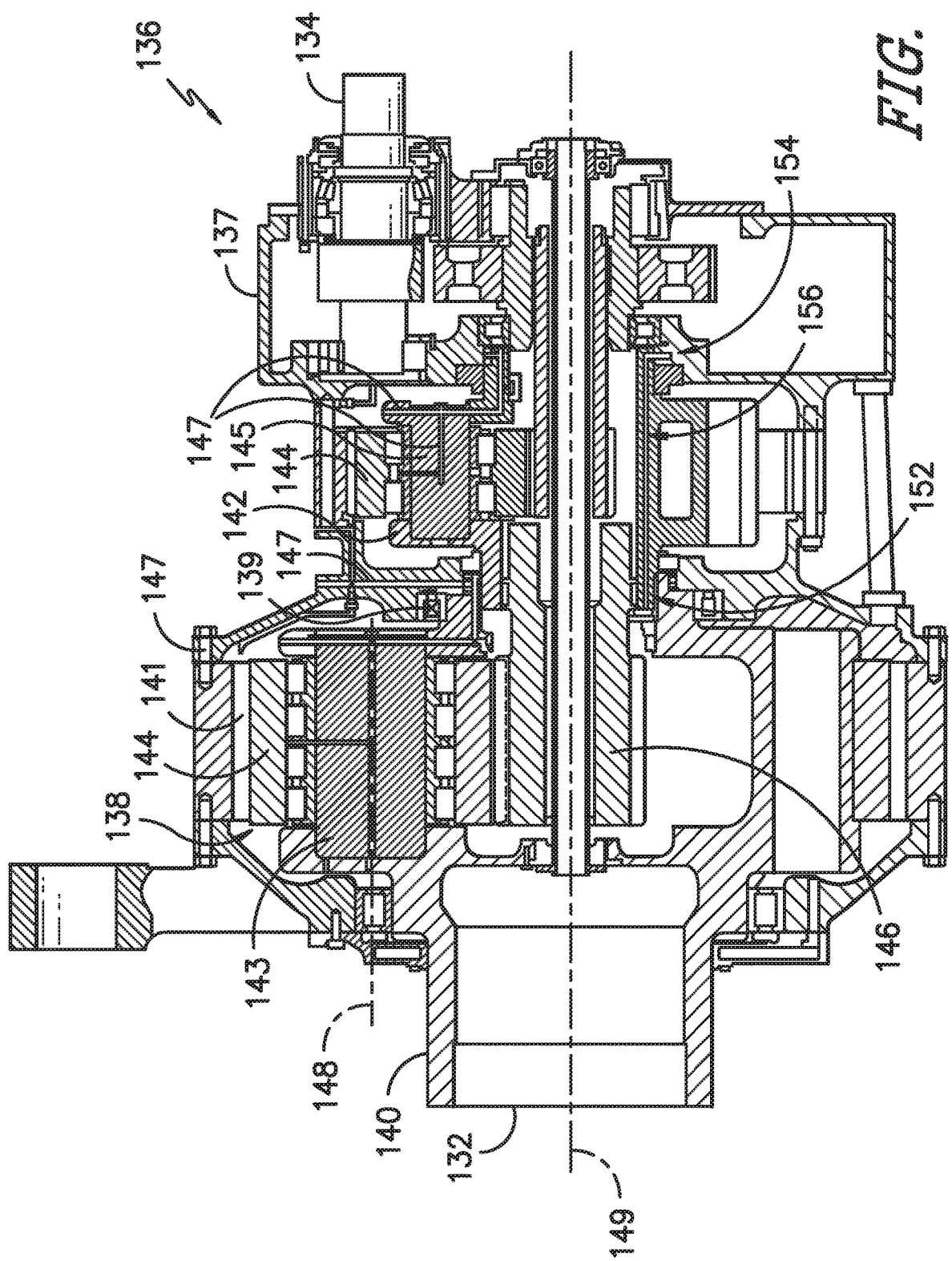

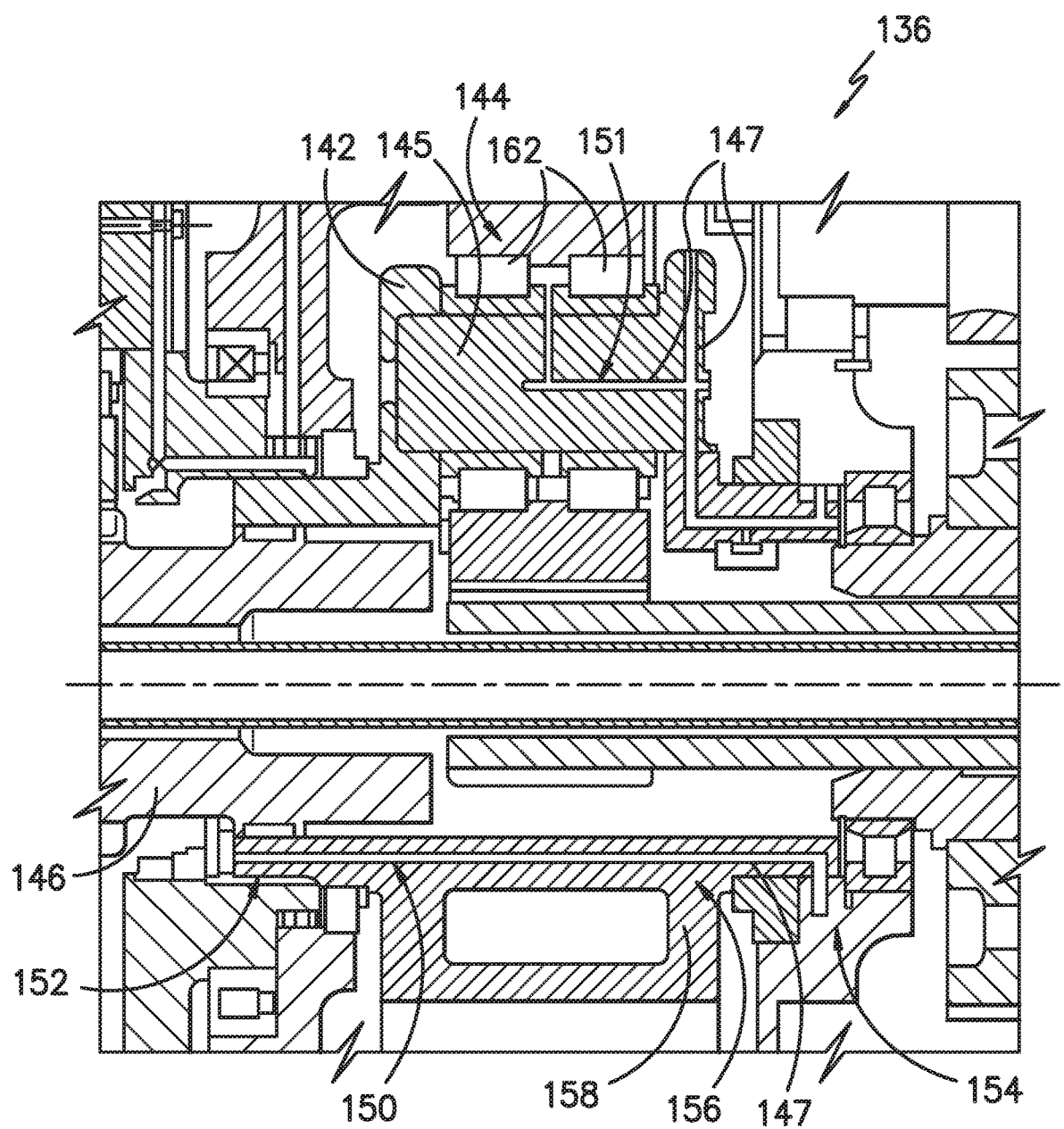
FIG. -5-

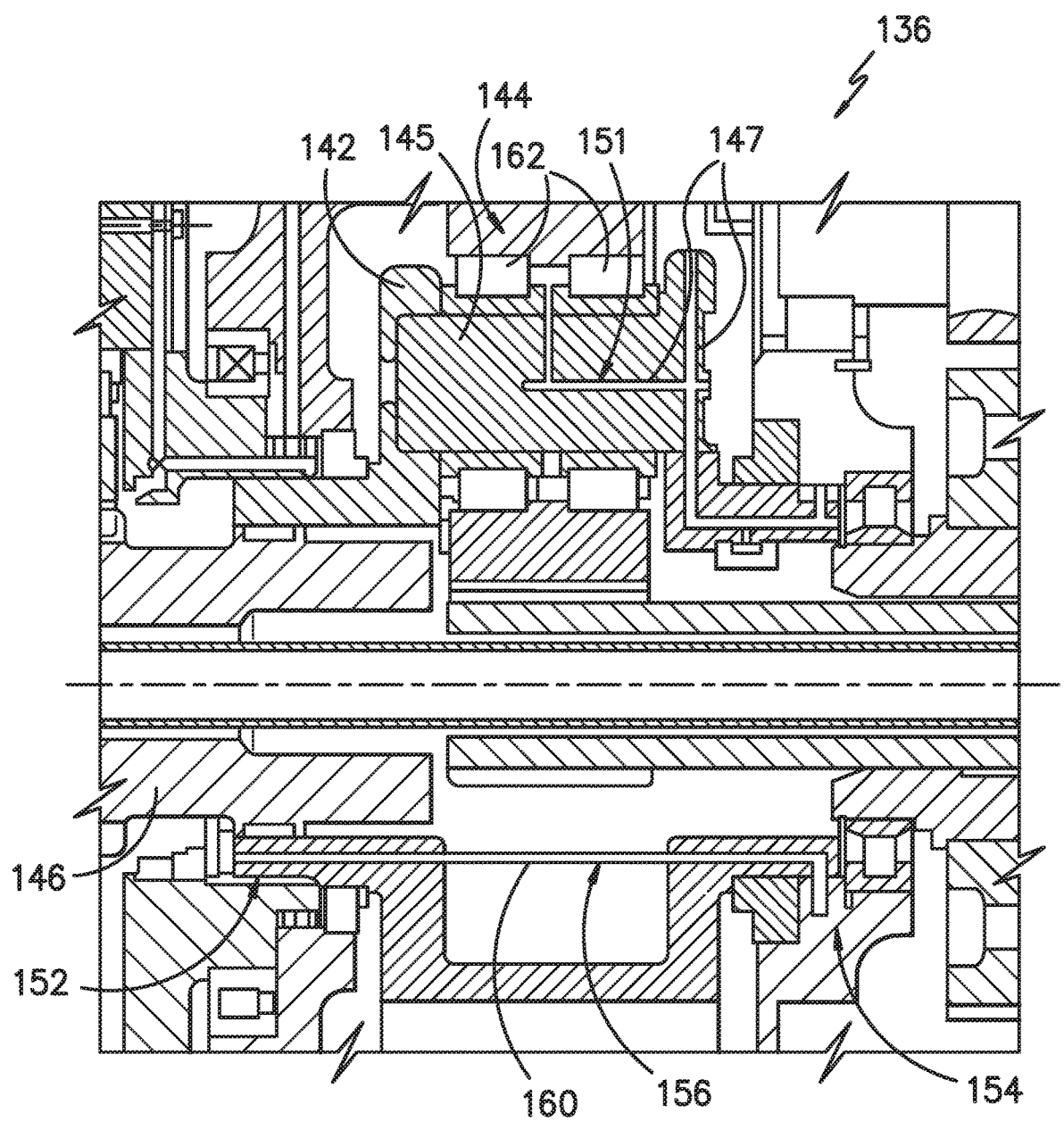
FIG. -6-

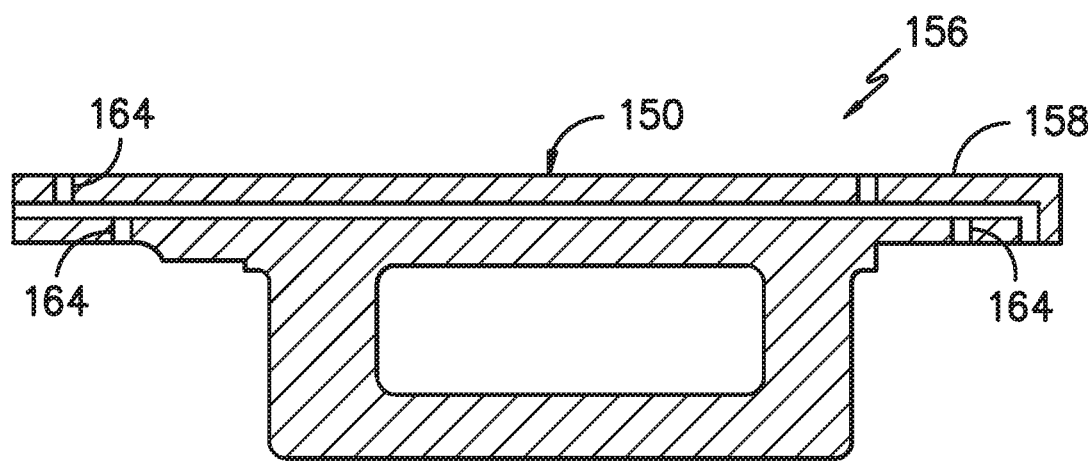
FIG. -7-
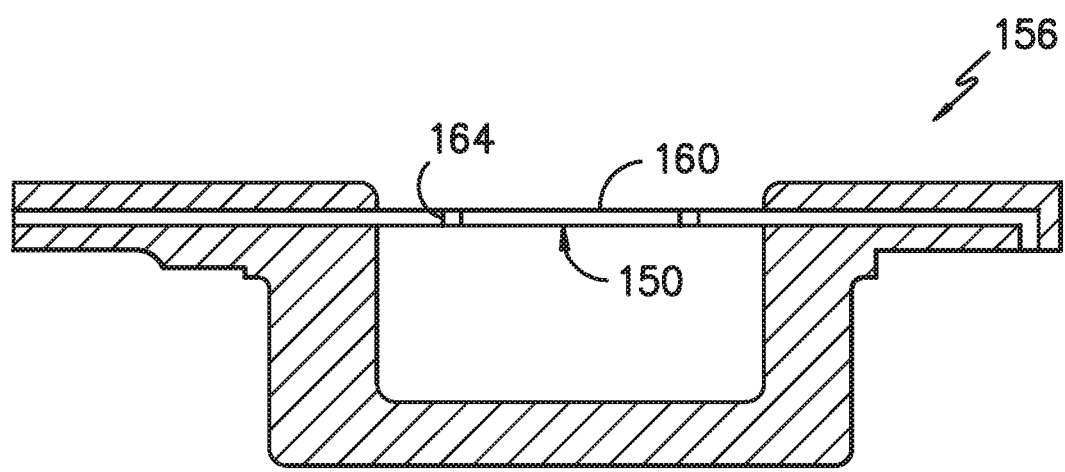
FIG. -8-

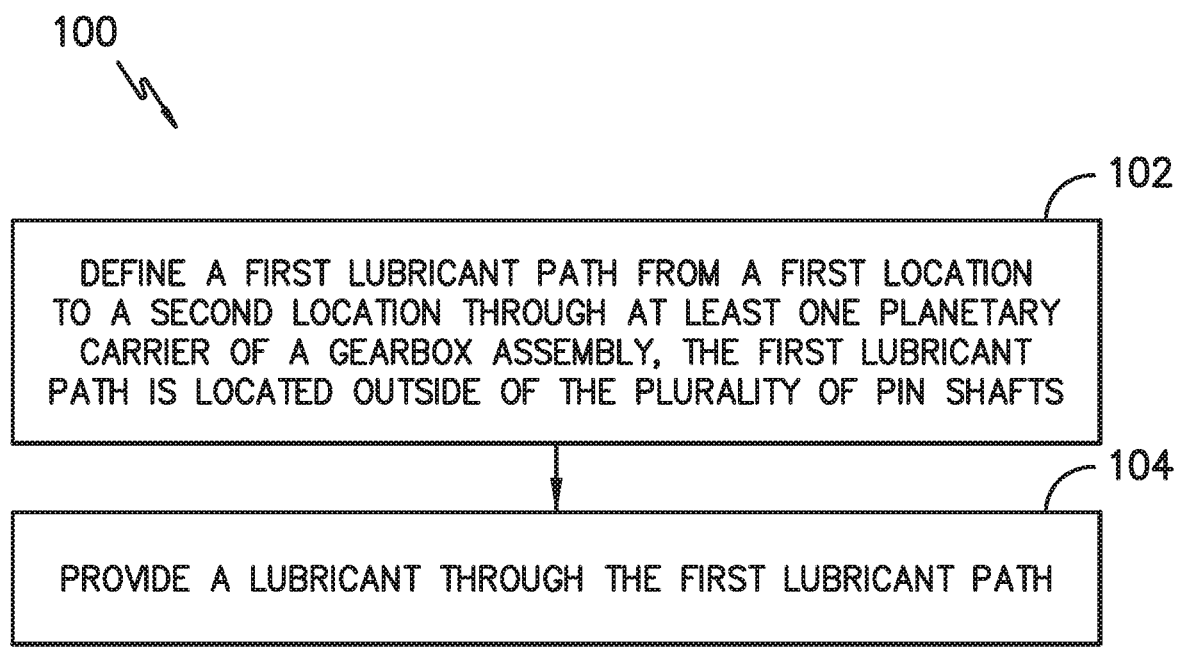

PLANET CARRIER OF A WIND TURBINE GEARBOX WITH IMPROVED LUBRICANT PATH

FIELD

The present disclosure relates in general to wind turbines, and more particularly to a planet carrier of a wind turbine gearbox having an improved lubricant path.

BACKGROUND

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator.

The gearbox generally includes a gearbox housing containing a plurality of gears (e.g., planetary, ring and/or sun gears) connected via one or more planetary carriers and bearings for converting the low speed, high torque input of the rotor shaft to a high speed, low torque output for the generator. Lubrication systems are often used within the gearbox to circulate oil therethrough, thereby decreasing the friction between the components of the gearbox as well as providing cooling for such components. In order for lubricant to reach the planetary bearings and/or the gear meshes of the gearbox, the lubricant must be transferred from the stationary gearbox housing to the rotating planetary carrier with minimum leakages.

For multi-stage gear systems, the first-stage and/or the second-stage planetary carriers can often be critical components for the gearbox. More specifically, conventional designs of the lubrication path of the second-stage planetary carrier can introduce high stress concentrations on the upwind plug region. Such concentrations limit the load capacity of the gearbox and cause a bottle-neck for further upgrades that require increased load needs.

Accordingly, an improved gearbox lubrication system for a wind turbine that addresses the aforementioned issues would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a gearbox assembly. The gearbox assembly includes a gearbox housing and a planetary gear system configured within the gearbox housing. The planetary gear system includes a plurality of planet gears, at least one sun gear, at least one ring gear, at least one planetary carrier operatively coupled with the plurality of planet gears, and a plurality of pin shafts. Each of the plurality of planet gears are arranged so as to rotate around one of the plurality of pin shafts. Further, the plurality of planet gears are engaged with the ring gear and configured to rotate about the sun gear. The gearbox assembly also includes a first lubricant path defined from a first location to a second location through the at least one planetary carrier. Moreover, the first lubricant path is located outside of the plurality of pin shafts.

In one embodiment, a portion of the lubricant path is defined through a manufactured component that is mounted between the second location and the first location. For example, in particular embodiments, the manufactured component may be formed via casting. In alternative embodiments, the manufactured component may include a pipe assembly having one or more pipes. In certain embodiments, the pipe assembly may include one or more holes configured to supply a lubricant to at least one of the sun gear or the plurality of planet gears.

In another embodiment, the planetary carrier(s) may include, at least, a first planetary carrier and a second planetary carrier. In such embodiments, the first location may include a downwind end of at least one of the first planetary carrier or the second planetary carrier. Similarly, the second location may include an upwind end of at least one of the first planetary carrier or the second planetary carrier. It should also be understood that the first location may be an upwind end of the first or second planetary carrier and the second location may be a downwind end of the first or second planetary carrier.

In further embodiments, the plurality of pin shafts may include, at least, a first pin shaft and a second pin shaft. As such, the first pin shaft may be arranged with the first planetary carrier and the second pin shaft may be arranged with the second planetary carrier.

In several embodiments, the gearbox assembly may include at least one additional oil path defined through at least one of the first pin shaft or the second pin shaft. In such embodiments, the additional oil path(s) may be defined from a downwind end of at least one of the first pin shaft or the second pin shaft to one or more bearings of the gearbox assembly.

In another aspect, the present disclosure is directed to a drivetrain assembly for a wind turbine. The drivetrain assembly includes a gearbox assembly and a generator coupled to an output shaft of the gearbox assembly. As such, the gearbox assembly is configured to convert a low speed, high torque input to a high speed, low torque output to drive the generator. The gearbox assembly includes a gearbox housing and a planetary gear system configured within the gearbox housing. The planetary gear system includes a plurality of planet gears, at least one sun gear, at least one ring gear, at least one planetary carrier operatively coupled with the plurality of planet gears, and a plurality of pin shafts. Each of the plurality of planet gears are arranged so as to rotate around one of the plurality of pin shafts. Further, the plurality of planet gears are engaged with the ring gear and configured to rotate about the sun gear. The gearbox assembly also includes a first lubricant path defined from a first location to a second location through the at least one planetary carrier. Moreover, the first lubricant path is located outside of the plurality of pin shafts. It should also be understood that the drivetrain assembly may further include any of the additional features described herein.

In yet another aspect, the present disclosure is directed to a method for lubricating a gearbox assembly of a wind turbine. The method includes defining a first lubricant path from a first location to a second location through at least one planetary carrier of the gearbox assembly. Further, the first lubricant path is located outside of the plurality of pin shafts. The method also includes providing a lubricant through the first lubricant path.

In one embodiment, the method includes installing a manufactured component between the second location and the first location and defining a portion of the lubricant path through the manufactured component. For example, in such embodiments, the method may include forming the manufactured component via casting. In alternative embodiments, the method may include forming the manufactured component from a pipe assembly having one or more pipes. In such embodiments, the method may include forming one or more holes in the one or more pipes of the pipe assembly, the one or more holes configured to supply a lubricant to at least one of the sun gear or the plurality of planet gears.

In another embodiment, the method further includes defining at least one additional oil path through at least one of the first pin shaft or the second pin shaft. More specifically, as mentioned, the additional oil path(s) may be defined from a downwind end of at least one of the first pin shaft or the second pin shaft to one or more bearings of the gearbox assembly. It should also be understood that the method may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine of conventional construction;

FIG. 2 illustrates a detailed, internal view of one embodiment of a nacelle of a wind turbine according to the present disclosure;

FIG. 3 illustrates a cross-sectional view of one embodiment of a gearbox assembly of a wind turbine according to conventional construction;

FIG. 4 illustrates a cross-sectional view of one embodiment of a gearbox assembly of a wind turbine according to the present disclosure;

FIG. 5 illustrates a partial, cross-sectional view of one embodiment of the gearbox assembly of FIG. 4;

FIG. 6 illustrates a partial, cross-sectional view of another embodiment of a gearbox assembly of a wind turbine according to the present disclosure;

FIG. 7 illustrates a cross-sectional view of one embodiment of a casting feature for providing a lubricant path according to the present disclosure;

FIG. 8 illustrates a cross-sectional view of one embodiment of a pipe assembly for providing a lubricant path according to the present disclosure; and, FIG. 9 illustrates a flow diagram of one embodiment of a method for lubricating a gearbox assembly of a wind turbine according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a gearbox assembly having an improved lubrication system. The gearbox assembly includes a housing that encloses a planetary gear system, as well as an optional helical gear system, a lubrication system, a cooling system, and/or a bearing system. The planetary gear system includes planet gears, a sun gear, a ring gear, first and second planetary carriers operatively coupled with the planet gears, and a plurality of pin shafts. Each of the planet gears are arranged so as to rotate around one of the pin shafts. Further, the planet gears are engaged with the ring gear and rotate about the sun gear. The gearbox assembly also includes a first lubricant path defined from a first location to a second location through, e.g. the secondary planetary carrier. Moreover, the first lubricant path is located outside of the plurality of pin shafts. As such, the improved lubrication path reduces bottle-necking of the lubricant in the planet carrier. Thus, the planetary carrier of the present disclosure has an increased margin for both static strength and fatigue life. In addition, the planetary carrier has improved (i.e. less complex) machinability.

Referring now to the drawings, FIG. 1 illustrates a perspective view of one embodiment of a wind turbine 10 of conventional construction. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or a turbine controller 26 centralized within the nacelle 16. For example, as shown in FIG. 2, the turbine controller 26 is disposed within a control cabinet mounted to a portion of the nacelle 16. However, it should be appreciated that the turbine controller 26 may be disposed at any location on or in the wind turbine 10, at any location on the support surface 14 or generally at any other location. In general, the turbine controller 26 may be configured to transmit and execute wind turbine control signals and/or commands in order to control the various operating modes (e.g., start-up or shut-down sequences) and/or components of the wind turbine 10.

Referring now to FIG. 2, a simplified, internal view of one embodiment of a nacelle 16 of a wind turbine 10 is illustrated. As shown, a generator 24 may be disposed within the nacelle 16. In general, the generator 24 may be coupled to the rotor 18 of the wind turbine 10 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox assembly 36. As is generally understood, the rotor shaft 32 may provide a low speed, high torque input to the gearbox assembly 36 in response to rotation of the rotor blades 22 and the hub 20. The gearbox assembly 36 may then be configured to convert the low speed, high torque input to a high speed, low torque output to drive the generator shaft 34 and, thus, the generator 24. In alternative embodiments, the rotor shaft 32 may be eliminated and the rotatable hub 20 may be configured to turn the gears of the gearbox assembly 36, rather than requiring a separate rotor shaft 32.

Referring now to FIG. 3, a cross-sectional view of a gearbox assembly 36 according to conventional construction is illustrated. As shown, the gearbox assembly 36 includes planetary gear system 38 housed within a gearbox housing 37. More specifically, the gear system 38 includes a plurality of gears (e.g., planetary, ring and/or sun gears) and bearings 39 for converting the low speed, high torque input of the rotor shaft 32 to a high speed, low torque output for the generator 24. For example, as shown, the input shaft 32 may provide an input load to the gear system 38 and the system 38 may provide an output load to the generator 24 (FIG. 2) as is generally known in the art. Thus, during operation, input load at an input rotational speed is transmitted through the planetary gear system 38 and provided as output load at output rotational speed to the generator 24.

Further, the planetary gear system 38 includes a first planetary carrier 40 and a second planetary carrier 42 operatively coupling a plurality of gears. Further, as shown, the planetary gear system 38 includes, at least, a ring gear 41, one or more planet gears 44, a sun gear 46, one or more first pin shafts 43, and one or more second pin shafts 45. For example, in several embodiments, the gear system 38 may include one, two, three, four, five, six, seven, eight, or more planet gears 44. Further, each of the gears 41, 44, 46 includes a plurality of teeth. The teeth are sized and shaped to mesh together such that the various gears 41, 44, 46 engage each other. For example, the ring gear 41 and the sun gear 46 may each engage the planet gears 44. In addition, it should be understood that the gears 41, 44, 46 described herein may include any suitable type of gears, including but not limited to spur gears, face gears, worm gears, helical gears, double helical gears, or similar.

In some embodiments, the planetary carriers 40, 42 may be stationary. In these embodiments, the input shaft 32 may be coupled to the ring gear 41, and input loads on the input shaft 32 may be transmitted through the ring gear 41 to the planet gears 44. Thus, the ring gear 41 may drive the gear system 38. In other embodiments, the ring gear 41 may be stationary. In these embodiments, the input shaft 32 may be coupled to the planetary carriers 40, 42, and input loads on the input shaft 32 may be transmitted through the planetary carriers 40, 42 to the planet gears 44. Thus, the planetary carriers 40, 42 may drive the gear system 38. In still further embodiments, any other suitable component, such as the planet gear 44 or the sun gear 46, may drive the gear system 38.

Still referring to FIG. 3, the sun gear 46 defines a central axis 49, and thus rotates about this central axis 49. The ring gear 41 may at least partially surround the sun gear 46, and be positioned along the central axis 49. Further, the ring gear 41 may (if rotatable) thus rotate about the central axis 49. Each of the planet gears 44 may be disposed between the sun gear 46 and the ring gear 41, and may engage both the sun gear 46 and the ring gear 41. For example, the teeth of the gears may mesh together, as discussed above. Further, each of the planet gears 44 may define a central planet axis 48, as shown. Thus, each planet gear 44 may rotate about its central planet axis 48. Additionally, the planet gears 44 and central planet axes 48 thereof may rotate about the central axis 49.

The gearbox assembly 36 may also include a lubrication system or other means for circulating oil throughout the gearbox components. For example, as shown in FIG. 3, the gearbox assembly 36 may include a plurality of oil passages 47 that are configured to transfer oil therethrough. As is generally understood, the oil may be used to reduce friction between the moving components of the gearbox assembly 36 and may also be utilized to provide cooling for such components, thereby decreasing component wear and other losses within the gearbox assembly 36 and increasing the lifespan thereof. In addition, the oil may contain properties that prevent corrosion of the internal gearbox components.

More specifically, as shown, the second-stage planetary carrier 42 includes an oil path 50 defined by a substantially axial oil passage 47 and a plurality of substantially radial passages 47 extending from the axial oil passage 47 to an outer surface of the second planetary carrier 42. In addition, as shown, one or more plugs 50 may be used to prevent leakage of the lubricant from the passages 47. This conventional oil path, however, introduces high stress concentrations at the upwind plug region (i.e. the drilled holes on the planetary carrier 42 where the plugs 50 are assembled), which limits the load capacity of the gearbox assembly 36.

As such, FIG. 4 illustrates a cross-sectional view of a gearbox assembly 136 according to the present disclosure. As shown, the gearbox assembly 136 includes planetary gear system 138 housed within a gearbox housing 137. More specifically, the gear system 138 includes a plurality of gears (e.g., planetary, ring and/or sun gears) and bearings 139 for converting the low speed, high torque input of the rotor shaft 132 to a high speed, low torque output for the generator 24. For example, as shown, the input shaft 132 may provide an input load to the gear system 138 and the system 138 may provide an output load to the generator 24 (FIG. 2) via output shaft 134. Thus, during operation, input load at an input rotational speed is transmitted through the planetary gear system 138 and provided as output load at output rotational speed to the generator 24.

Further, as shown, the planetary gear system 138 includes a first planetary carrier 140 and a second planetary carrier 142 operatively coupling a plurality of gears. Further, as shown, the planetary gear system 138 includes, at least, a ring gear 141, one or more planet gears 144, a sun gear 146, one or more first pin shafts 143, and one or more second pin shafts 145. For example, in several embodiments, the gear system 138 may include one, two, three, four, five, six, seven, eight, or more planet gears 144. Further, each of the gears 141, 144, 146 includes a plurality of teeth. The teeth are sized and shaped to mesh together such that the various gears 141, 144, 146 engage each other. For example, the ring gear 141 and the sun gear 146 may each engage the planet gears 144. In addition, as mentioned, it should be understood that the gears 141, 144, 146 described herein may include any suitable type of gears, including but not limited to spur gears, face gears, worm gears, helical gears, double helical gears, or similar.

In some embodiments, the planetary carriers 140, 142 may be stationary. In these embodiments, the input shaft 132 may be coupled to the ring gear 141, and input loads on the input shaft 132 may be transmitted through the ring gear 141 to the planet gears 144. Thus, the ring gear 141 may drive the gear system 138. In other embodiments, the ring gear 141 may be stationary. In these embodiments, the input shaft 132 may be coupled to the planetary carriers 140, 142, and input loads on the input shaft 132 may be transmitted through the planetary carriers 140, 142 to the planet gears 144.

Still referring to FIG. 4, the sun gear 146 defines a central axis 149, and thus rotates about this central axis 149. The ring gear 141 may at least partially surround the sun gear 146, and be positioned along the central axis 149. For example, the ring gear 141 may be aligned with the sun gear 146 along the central axis 149, or may be offset from the sun gear 46 along the axis 149. The ring gear 141 may (if rotatable) thus rotate about the central axis 149. Each of the planet gears 144 may be disposed between the sun gear 146 and the ring gear 41, and may engage both the sun gear 146 and the ring gear 141. Further, each of the planet gears 144 may define a central planet axis 148, as shown. Thus, each planet gear 144 may rotate about its central planet axis 148. Additionally, the planet gears 144 and central planet axes 148 thereof may rotate about the central axis 149.

Referring now to FIGS. 4-6, the gearbox assembly 136 may also include a lubrication system or other means for circulating oil throughout the gearbox components. For example, as shown, the gearbox assembly 136 may include a plurality of oil passages 147 that are configured to transfer oil therethrough. As is generally understood, the oil may be used to reduce friction between the moving components of the gearbox assembly 136 and may also be utilized to provide cooling for such components, thereby decreasing component wear and other losses within the gearbox assembly 136 and increasing the lifespan thereof. In addition, the oil may contain properties that prevent corrosion of the internal gearbox components.

More specifically, as shown in FIGS. 5 and 6, the second-stage planetary carrier 142 includes a first lubricant path 150 defined from a first location to a second location through at least one of the planetary carriers 140, 142, i.e. outside of and not through the plurality of pin shafts 143, 145. As such, the lubricant path 150 of the present disclosure avoids having to drill holes on the load path of the second planetary carrier 142. In addition, as shown, the plug 50 is also eliminated. For example, as shown, the first lubricant path 150 is defined from a first location 154 to a second location 152 through the secondary planetary carriers 142. In such embodiments, the first location 154 may include a downwind end of the first planetary carrier 140 and/or the second planetary carrier 142. Similarly, the second location 152 may include a downwind end of the first planetary carrier 140 and/or the second planetary carrier 142.

In addition, as shown, a portion of the lubricant path 150 may be defined through a manufactured component 156 that is mounted between the second location 152 and the first location 154. For example, as shown in FIG. 5, the manufactured component 156 may be a casting feature 158 formed via casting. With the addition of the casting features 158, the lubricant path 150 is simplified to require only a single drilled hole through the secondary planetary carrier 142 away from the high-stress area and/or load path. In alternative embodiments, as shown in FIG. 6, the manufactured component 156 may include a pipe assembly 160 having one or more pipes.

In further embodiments, as shown in FIGS. 7 and 8, the manufactured component 156 may further include one or more holes 164 configured to supply a lubricant for the meshing sun gear 146 and/or planet gears 144. As such, the holes 164 may be configured to spray lubricant to any neighboring components in the gearbox assembly 136.

In several embodiments, the gearbox assembly 136 may include at least one additional oil path 151 defined through one of first or second pin shafts 143, 145. In such embodiments, as shown, the additional oil path(s) 151 may be defined from a downwind end of the first or second pin shafts 143, 145 to one or more bearings 162 of the gearbox assembly 136.

Referring now to FIG. 9, a flow diagram of one embodiment of a method 100 for lubricating the gearbox assembly 136 of the wind turbine 10 is illustrated. As shown at 102, the method 100 includes defining the first lubricant path 150 from the first location 154 to the second location 152 through at least one planetary carrier 140, 142 of the gearbox assembly 136. Further, as mentioned, the first lubricant path is located outside of the plurality of pin shafts 143, 145. As shown at 104, the method 100 includes providing a lubricant through the first lubricant path 150.

In one embodiment, the method 100 includes installing a manufactured component 156 between the second location 152 and the first location 154 and defining a portion of the lubricant path 150 through the manufactured component 156. For example, in such embodiments, the method 100 may include forming the manufactured component 156 via casting. In alternative embodiments, the method 100 may include forming the manufactured component 156 from a pipe assembly 160 having one or more pipes.

In another embodiment, the method 100 further includes defining at least one additional oil path 151 through one or both of the first or second pin shafts 143, 145. In such embodiments, the additional oil path(s) 151 may be defined from the downwind end 154 of one of the first or second pin shafts 143, 145 to one or more bearings 162 of the gearbox assembly 136.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gearbox assembly, comprising:
   a gearbox housing;
   a planetary gear system configured within the gearbox housing, the planetary gear system comprising a plurality of planet gears, at least one sun gear, at least one ring gear, at least one planetary carrier operatively coupled with the plurality of planet gears, and a plurality of pin shafts, each of the plurality of planet gears arranged so as to rotate around one of the plurality of pin shafts, the plurality of planet gears being engaged with the ring gear and configured to rotate about the sun gear;
   the at least one planetary carrier comprising a first planetary carrier and a second planetary carrier;
   a first lubricant path defined through the second planetary carrier from a first location at a downwind end of the second planetary carrier to a second location at an upwind end of the second planetary carrier, the first lubricant path located outside of the plurality of pin shafts.

2. The gearbox assembly of claim 1, wherein a portion of the lubricant path is defined through a manufactured component that is mounted between the second location and the first location.

3. The gearbox assembly of claim 2, wherein the manufactured component is formed via casting.

4. The gearbox assembly of claim 2, wherein the manufactured component comprises a pipe assembly, the pipe assembly comprises one or more pipes.

5. The gearbox assembly of claim 4, wherein the pipe assembly comprises one or more holes configured to supply a lubricant to at least one of the sun gear or the plurality of planet gears.

6. The gearbox assembly of claim 1, wherein the plurality of pin shafts comprises, at least, a first pin shaft and a second pin shaft, the first pin shaft arranged with the first planetary carrier, the second pin shaft arranged with the second planetary carrier.

7. The gearbox assembly of claim 6, further comprising at least one additional oil path defined through at least one of the first pin shaft or the second pin shaft.

8. The gearbox assembly of claim 7, wherein the at least one additional oil path is defined from a downwind end of at least one of the first pin shaft or the second pin shaft to one or more bearings of the gearbox assembly.

9. A drivetrain assembly for a wind turbine, the drivetrain assembly comprising:
   a gearbox assembly, comprising:
      a gearbox housing;
      a planetary gear system configured within the gearbox housing, the planetary gear system comprising a plurality of planet gears, at least one sun gear, at least one ring gear, at least one planetary carrier operatively coupled with the plurality of planet gears, and a plurality of pin shafts, each of the plurality of planet gears arranged so as to rotate around one of the plurality of pin shafts, the plurality of planet gears being engaged with the ring gear and configured to rotate about the sun gear;
      the at least one planetary carrier comprising a first planetary carrier and a second planetary carrier;
      a first lubricant path defined through the second planetary carrier from a first location at a downwind end of the second planetary carrier to a second location at an upwind end of the second planetary carrier, the first lubricant path located outside of the plurality of pin shafts, and
   a generator coupled to an output shaft of the gearbox assembly, the gearbox assembly configured to convert a low speed, high torque input to a high speed, low torque output to drive the generator.

10. A method for lubricating a gearbox assembly of a wind turbine, the method comprising:
    defining a first lubricant path from a first location to a second location through at least one planetary carrier of the gearbox assembly, the first lubricant path located outside of the plurality of pin shafts;
    the at least one planetary carrier comprising a first planetary carrier and a second planetary carrier;
    a first lubricant path defined through the second planetary carrier from a first location at a downwind end of the second planetary carrier to a second location at an upwind end of the second planetary carrier, the first lubricant path located outside of the plurality of pin shafts; and,
    providing a lubricant through the first lubricant path.

11. The method of claim 10, further comprising installing a manufactured component between the second location and the first location and defining a portion of the lubricant path through the manufactured component.

12. The method of claim 11, further comprising forming the manufactured component via casting.

13. The method of claim 11, further comprising forming the manufactured component from a pipe assembly having one or more pipes.

14. The method of claim 13, further comprising forming one or more holes in the one or more pipes of the pipe assembly, the one or more holes configured to supply a lubricant to at least one of the sun gear or the plurality of planet gears.

15. The method of claim 10, wherein the plurality of pin shafts comprises, at least, a first pin shaft and a second pin shaft, the first pin shaft arranged with the first planetary carrier, the second pin shaft arranged with the second planetary carrier.

16. The method of claim 15, further comprising defining at least one additional oil path through at least one of the first pin shaft or the second pin shaft, wherein the at least one additional oil path is defined from a downwind end of at least one of the first pin shaft or the second pin shaft to one or more bearings of the gearbox assembly.

* * * * *